United States Patent
Mabee

[11] Patent Number: 6,112,560
[45] Date of Patent: Sep. 5, 2000

[54] TRACK LOCK FOR SNOWMOBILES

[76] Inventor: Larry Mabee, Box 21, Selkirk, Manitoba, Canada, R1A 2B1

[21] Appl. No.: 09/275,940

[22] Filed: Mar. 25, 1999

[30] Foreign Application Priority Data

Jun. 29, 1998 [CA] Canada ................................ 2,242,063

[51] Int. Cl.⁷ .......................... B62D 55/205; E05B 25/00
[52] U.S. Cl. ..................................... 70/14; 70/19; 70/226; 70/237; 70/417; 180/190; 180/287
[58] Field of Search ................................ 70/19, 209, 417, 70/236, 57, 58, 14, 18, 225, 226, 237; 180/190, 287

[56] References Cited

U.S. PATENT DOCUMENTS

| | | | |
|---|---|---|---|
| 2,556,900 | 6/1951 | Buschhorn | 70/19 X |
| 3,820,662 | 6/1974 | Steers | 70/417 X |
| 4,961,331 | 10/1990 | Winner | 70/417 X |
| 5,239,849 | 8/1993 | Gallardo | 70/209 |
| 5,265,449 | 11/1993 | Rashleigh | 70/233 X |
| 5,372,018 | 12/1994 | Smith | 70/19 X |
| 5,381,679 | 1/1995 | Cummins | 70/226 X |
| 5,419,165 | 5/1995 | Perkins | 70/19 X |
| 5,730,008 | 3/1998 | Case et al. | 70/18 |
| 5,794,462 | 8/1998 | Steele et al. | 70/56 X |
| 5,802,887 | 9/1998 | Béland | 70/237 X |
| 5,887,464 | 3/1999 | Perez | 70/226 X |
| 5,927,108 | 7/1999 | Pierce | 70/226 X |

FOREIGN PATENT DOCUMENTS 2039840  8/1980  United Kingdom ................. 70/209

*Primary Examiner*—Lloyd A. Gall
*Attorney, Agent, or Firm*—Murray E. Thrift; Adrian D. Battison

[57] ABSTRACT

The track lock for snowmobiles is a portable anti-theft device secured to the track of a snowmobile. The device is in the form of a main arm which is longer than a standard snowmobile track. Clamps are included for securing the main bar to the track in the form of one fixed clamp and one movable clamp. A lock is provided for fixing the movable clamp in place while the device is in use. Wings extend outward from the device across outer edge sections of the track to prevent the device from being removed by cutting the track. Guards in the form of flanges are also included on the device to surround and protect the locking mechanism. A flexible member extends through the main arm and connects between the first and second clamps. The flexible member is made of a suitable high tensile strength material to resist being cut therethrough.

18 Claims, 4 Drawing Sheets

TRACK LOCK FOR SNOWMOBILES

FIELD OF THE INVENTION

This invention relates to physical locking mechanisms, and more particularly to interference type looking mechanisms for snowmobiles.

BACKGROUND OF THE INVENTION

The snowmobile is typically a small uncovered vehicle for transportation of only one or two persons in many regions where the winter climates permit. These machines generally are set to motion by means of a powered track, most commonly of the type with a track having a center section and two outer edge sections connected by track bars. These tracks are covered with evenly spaced treads on the outer surface and evenly spaced gear teeth on the inner surface.

Snowmobiles are commonly left unattended, just as many other vehicles are, at home or away. This presents many opportunities for unauthorised persons to gain access to and steal a vehicle of this type as their components are relatively accessible due to the nature of the vehicle. The problem occurring is that in some cases the snowmobiles' engines can be started by unwanted persons and can thus be driven.

There exists limited prior art that physically locks a snowmobile from being driven even if the engine is turned on. In previous cases the prior art locking device has not been well secured to the track of the snowmobile or it has been difficult to attach the device to the track.

SUMMARY OF THE INVENTION

It is an object of the present invention, therefore, to provide an improved physical locking device for securing the track of a snowmobile when it is not in use.

According to a first aspect of the invention there is provided a portable anti-theft device for use in conjunction with a tracked snowmobile comprising:

a main arm which is longer than a standard snowmobile track;

clamp means for clamping the arm to the track including first and second clamps in the form of confronting hooks for engaging over opposite side edges of the track, with a section of each clamp extending over an inner face of the track, the clamp being mounted on the arm for relative movement of the clamps towards one another; and locking means for locking the clamp means on the arm.

Preferably the first clamp is fixed to the arm and the second clamp is movable along the arm to simplify attachment and removal of the device including the locking and unlocking procedures.

It is also preferred the clamps include wings which extend across the outer edge sections for a snowmobile track having a center section and two outer edge sections connected by track bars, to overlap two adjacent track bars and inhibit removal of the device by cutting the outer edge section of the track.

Preferably the main arms also include wings which extend across the outer edge sections for a snowmobile track having a center section and two outer edge sections connected by track bars, to overlap two adjacent track bars and inhibit removal of the device by cutting the outer edge section of the track.

The device preferably includes an internal locking mechanism mounted on the second clamp in the form of a key lock including a pin for insertion into an aperture on the main arm.

The main arm may be a tubular member being enclosed at respective ends of the main arm. When the main arm is a tubular member there may be provided a flexible member extending through the tubular member connected between first and second ends of the main arm, the flexible member being made of a suitable high tensile strength material to resist being cut therethrough. The flexible member is preferably in the form of a steel cable such as a high tensile strength steel aircraft cable. Such a cable is very resistant to being cut and is flexible enough that when mounted within the main arm it can flex and shift therein thus making it more difficult to engage with a cutting blade and cut.

According to another aspect of the invention there is provided a portable anti-theft device for a snowmobile track having a center section and two outer edge sections connected by track bars, comprising:

a main arm which is longer than a standard snowmobile track wherein the main arm includes wings which extend across the outer edge section of the track for overlapping two adjacent track bars;

clamp means for clamping the arm to the track including first and second clamps in the form of confronting hooks for engaging over opposite side edges of the track, with a section of each clamp extending over an inner face of the track, each said section including wings which extend across the outer edge section of the track for overlapping two adjacent track bars, the first clamp being fixed on the arm, the second clamp being mounted on a movable collar on the main arm for relative movement of the clamps towards one another;

a flexible member extending through the main arm between first and second ends of the main arm, the flexible member being made of suitable high tensile strength material to resist being cut therethrough; and an internal locking mechanism mounted on the second clamp in the form of a key lock including a pin for insertion into an aperture on the main arm and a guard in the form of flanges extending from the base of the lock and surrounding the lock housing.

BRIEF DESCRIPTION OF THE DRAWINGS

In drawings which illustrate embodiments of the invention.

DETAILED DESCRIPTION

Figure 1:
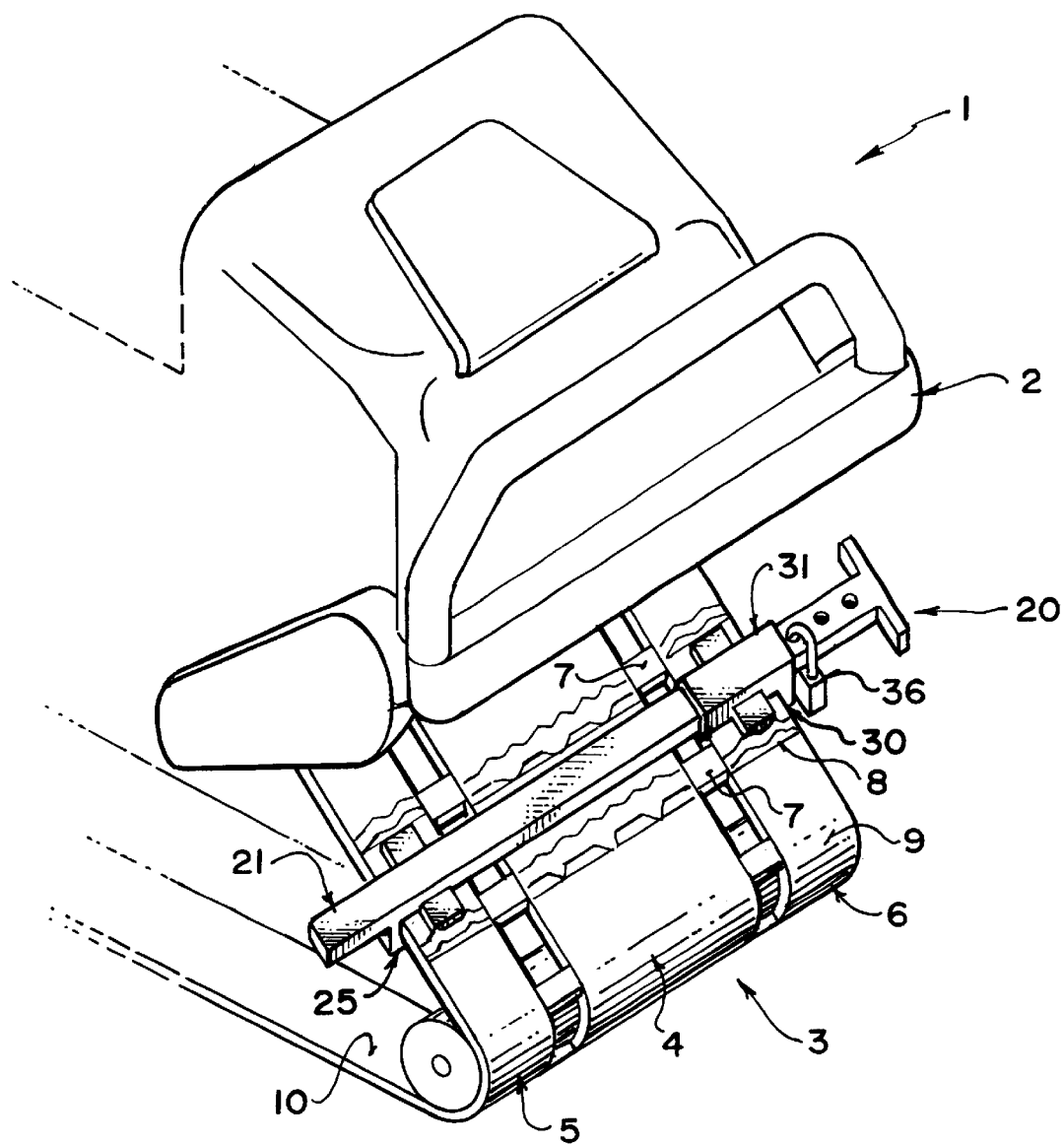
FIG. 1 is an isometric view from the left rear of a snowmobile with the device of the present invention engaged thereon.
Figure 3:
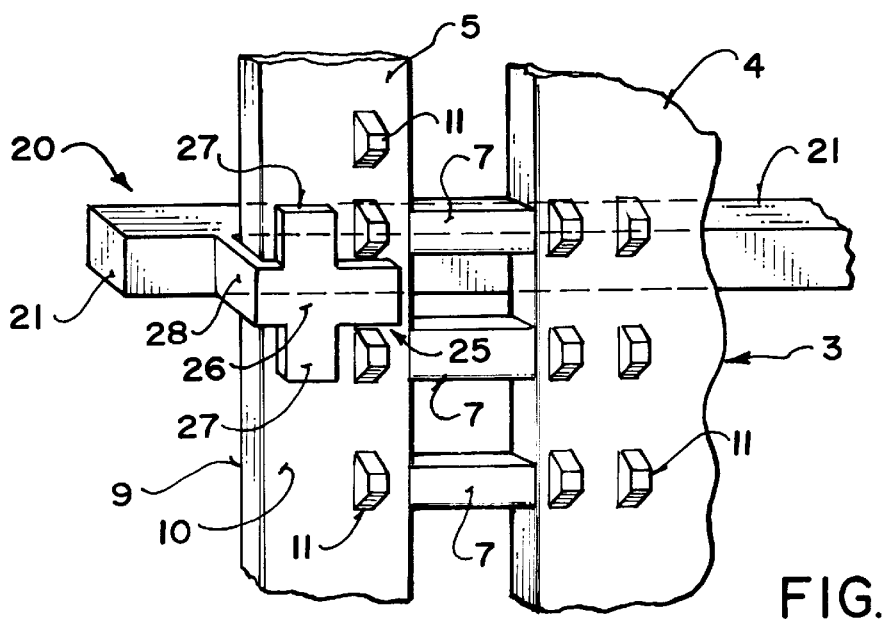
FIG. 3 is a view of the inner face of a snowmobile track with the device of the present invention engaged thereon.

Reference will now be made to FIG. 1 and 3, which show the anti-theft device 20 of the present invention installed on a tracked snowmobile 1. The device is for use on a snowmobile 1 of the type with a track 3 having a center section 4 and two outer edge sections 5, 6 connected by track bars 7. The outer face 9 of the track 3 is covered with evenly spaced treads 8 and the inner face 10 is covered with evenly spaced lugs 11. The device 20 is positioned between two adjacent treads 8 of the track 3 and remains fixed there while the snowmobile 1 is not in use. When the device 20 is installed on the snowmobile 1 and the snowmobile 1 is driven forward, the track 3 will advance until the main arm 21 of the device 20 will contact the body 2 of the snowmobile 1 which stops the movement of the track 3 and thus stops the movement of the snowmobile 1.

Figure 2:
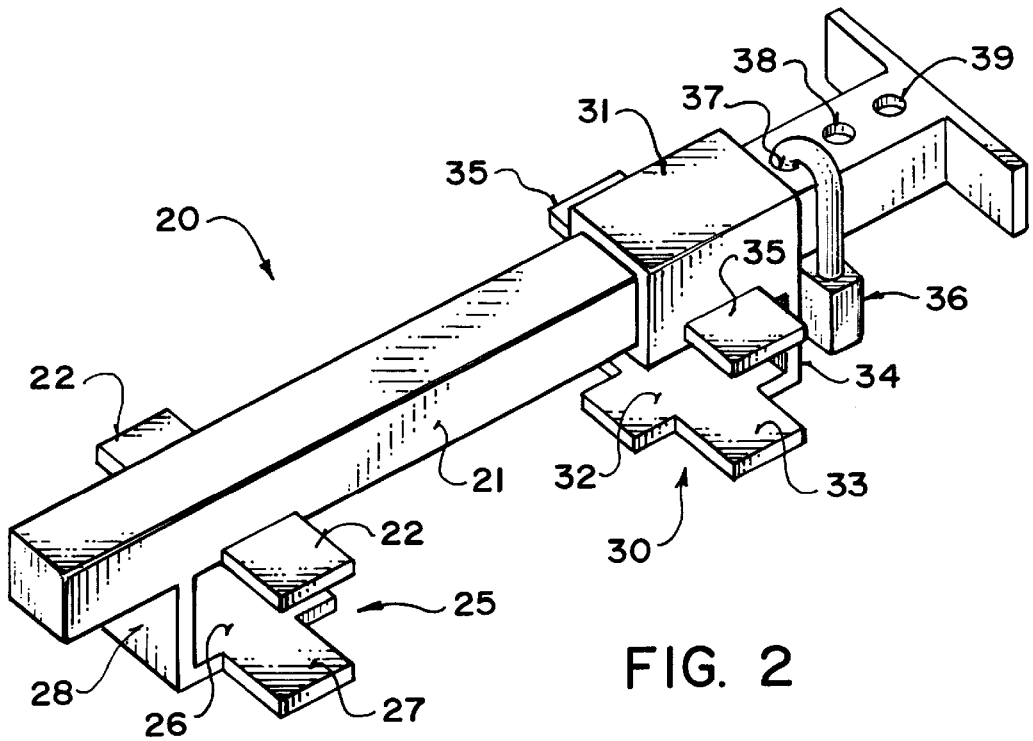
FIG. 2 is an isometric view of the device of the present invention.

Reference will now be made to FIGS. 1 and 2 to describe the parts of the device 20 in detail. The device 20 includes main arm 21 in the form of a rectangular cross-section bar which is longer than the width of track 3. The main arm 21 is fitted between two adjacent treads 8 of the track 3 and includes wings 22 in the form of guard flanges. These wings extend across the outer edge section 5 of the track 3 for overlapping two adjacent track bars 7 and restrict ability to cut the outer edge section 5 of the track 3 to remove the device 20.

Clamp means for clamping the main arm 21 to the track 3 includes a first clamp 25 and a second clamp 30 facing each other in the form of confronting hooks for engaging over opposite outer edge sections 5 and 6 of the track 3. The first clamp 25 comprises a mounting section 28 which extends from the main arm 21 the thickness of the track 3 and connects a retaining section 26 to the main arm 21. Section 26 of the first clamp 25, extends over the inner face 10 of the track 3 and includes wings 27 in the form of guard flanges. The wings 27 extend across the outer edge section 5 of the track 3 for overlapping two adjacent track bars 7. The first clamp 25 is fixedly mounted to the main arm 21. The second clamp 30 comprises a mounting section 34 which extends from a rectangular cross-section collar 31 the thickness of the track 3 and connects a retaining section 32 to the collar 31. Section 32 of the second clamp 30, extends over the inner face 10 of the track 3 and includes wings 33 in the form of guard flanges. The wings 33 extend across the outer edge section 6 of the track 3 for overlapping two adjacent track bars 7. The second clamp 30 is movable as it is mounted to the collar 31 which slides along the main arm 21. The collar 31 includes wings 35 in the form of guard flanges which extend across the outer edge section 6 of the track 3 for overlapping two adjacent track bars 7.

Locking means for fixing the second clamp 30 firmly against the outer edge section 6 of the track 3 is accomplished by a padlock 36 inserted through aperture 37 in the main arm 21. This restricts the movement of the collar 31 and fixes the second clamp 30 to the main arm 21. Inserting the padlock 36 through apertures 38 and 39 will fix the second clamp 30 for different widths of the track 3.

The first clamp 25 and the second clamp 30 are fitted closely to the thickness of the track 3, the spacing between two adjacent lugs 11 of track 3 and the spacing between two adjacent treads 8 of the track 3. As a result, it is very difficult to tamper with the device 20 when it is engaged on the track 3 of the snowmobile 1. However, engaging the device 20 onto the track 3 of the snowmobile 1 is easily accomplished as the device 20 does not need to be threaded across the inner face 10 of the snowmobile 1.

Figure 4:
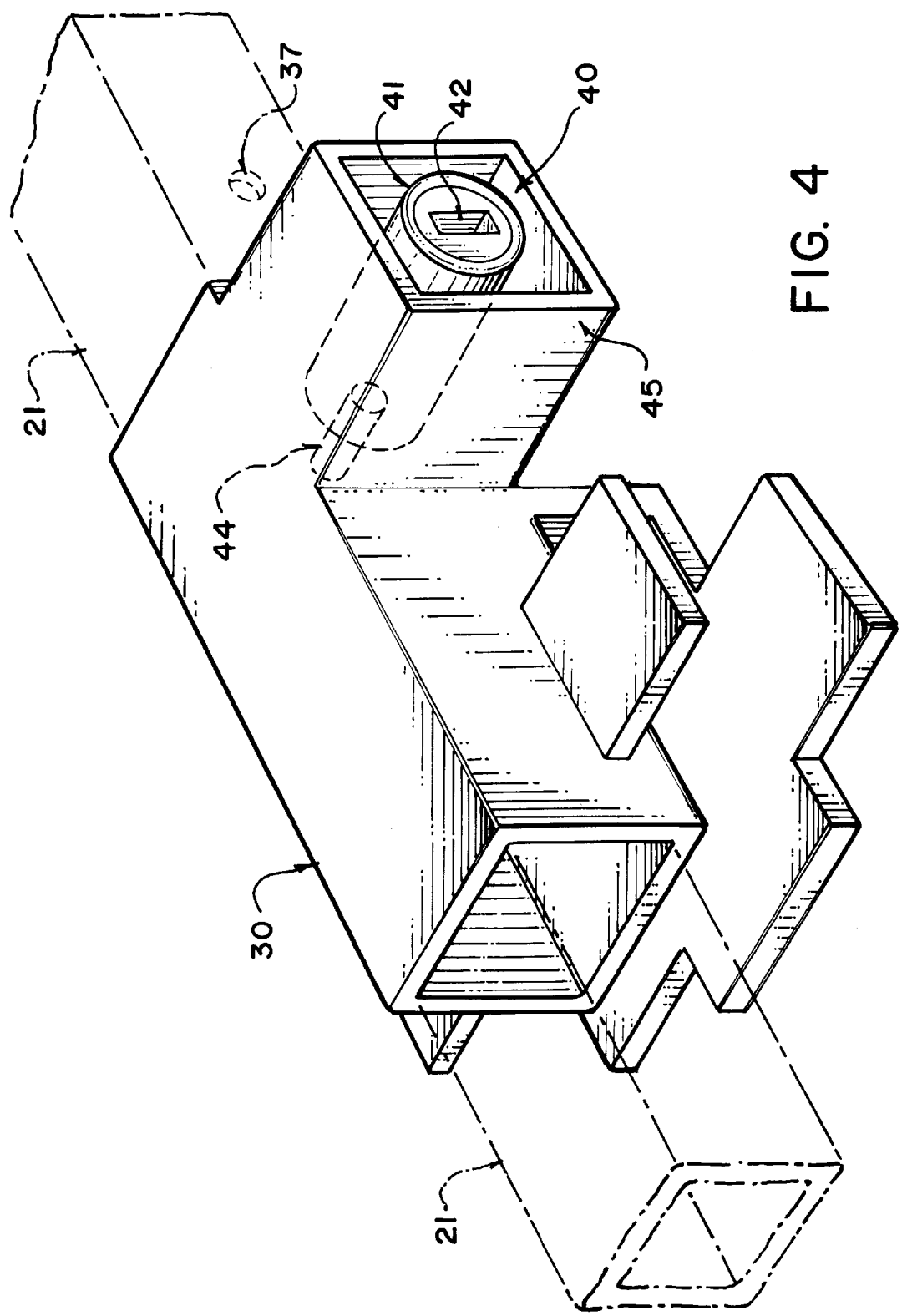
FIG. 4 is an isometric view of a locking mechanism for the device.

In a different embodiment of the invention as shown in FIG. 4 the device may include a locking mechanism 40 mounted directly to the second clamp 30. The locking mechanism is a conventional pin lock. It includes a lock housing 41 with a key hole 42 in an outer end. The key inserted in the key hole 42 activates an internal mechanism which extends a locking pin 44 into the aperture 37 on the main arm 21 of the device. Also included on the locking mechanism 40 is a guard 45 in the form of flanges extending from the base of the lock and surrounding the lock housing.

Various modifications can be made in the invention as herein above described. For example, the padlock 36 may be substituted for a variety of locking devices including an internal locking mechanism on the sliding collar 31 as shown in the embodiments represented in the drawings. Also the rectangular cross-section of the main bar 21 and collar 31 may be substituted for a circular cross-section without affecting the function of the invention.

Figure 5:
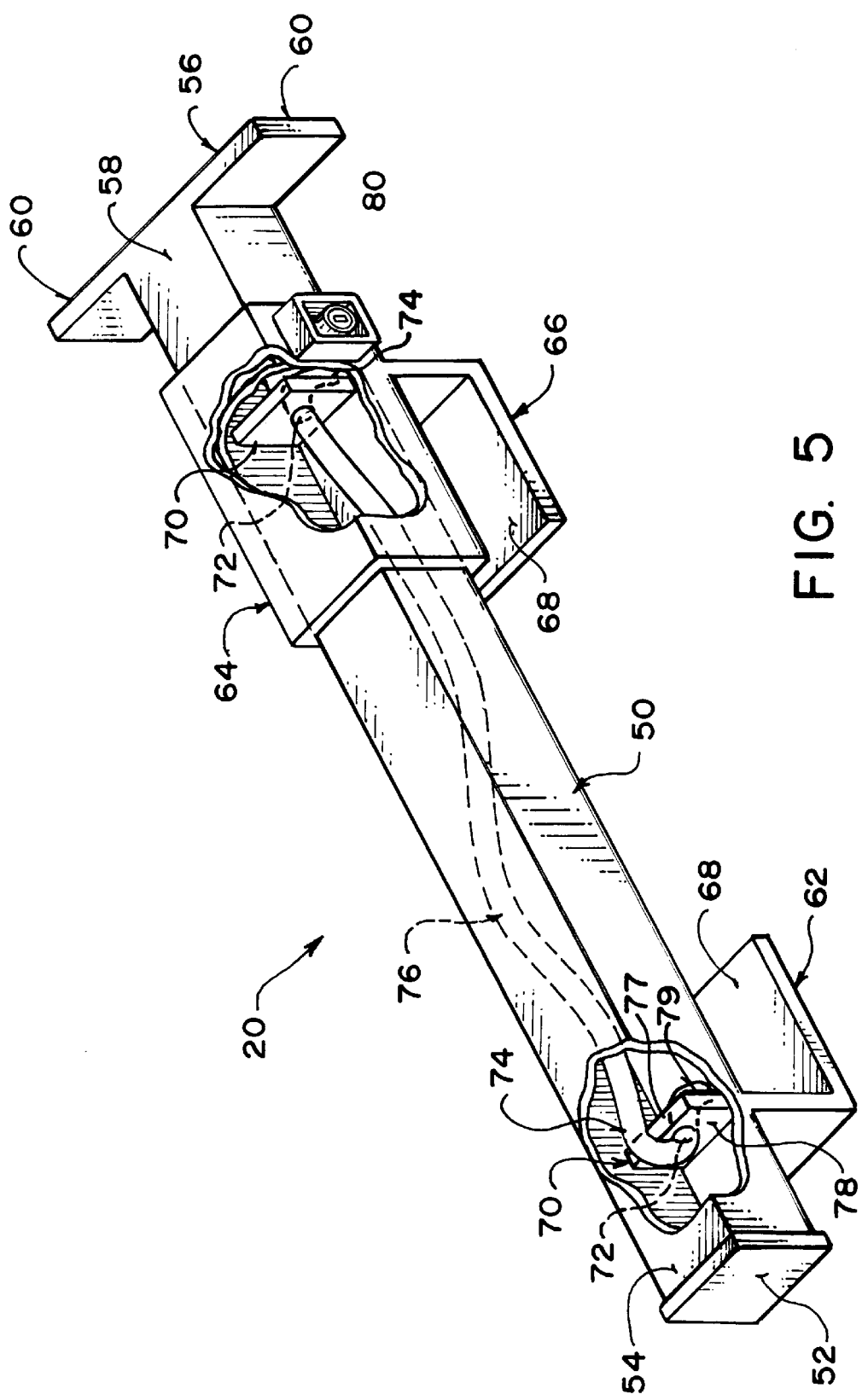
FIG. 5 is an isometric view of a second embodiment of the anti-theft device.

Referring to FIG. 5 there is illustrated a further embodiment of the anti-theft device 20. The device includes a main arm 50 of aluminum being tubular and having a rectangular cross section. A cap 52 encloses a first end 54 of the main arm 50 while a rectangular plate 56 encloses a second end 58. The rectangular plate 56 is wider than the main arm 50 so as to define a pair of lateral flanges 60.

A first clamp 62 is welded to the main arm 50 towards the first end 54. A collar 64 mounts a second clamp 66 thereon. The collar 64 is slidably mounted on the main arm 50 towards the second end 58 for sliding movement of the second clamp 66 in relation to the first clamp 62. The lateral flanges 60 restrict the collar 64 from sliding off the second end 58 of the main bar 50.

Each clamp 62 and 66 includes a hook portion 68 being arranged to clamp over opposing outer edge sections of the snowmobile track.

A pair of rectangular plate members 70 are mounted within the main arm towards respective ends of the main arm. The rectangular plates are each welded within the main arm perpendicular thereto and include an aperture 72 for receiving a respective end 74 of a steel cable 76 therethrough.

The end 74 of the cable 76 which is mounted near the first end 54 extends over a top end 77 of the plate 70 and is inserted through an outer face 78 of the plate 70 such that the cable can be welded to an inner face 79 of the plate. The end 74 of the cable is thus inaccessible to tampering even if the cap 52 is removed from the end of the main arm.

The steel cable 76 extends between the rectangular plates 70 such that there is some slack therebetween and the cable can flex and shift within the main arm. The steel cable is a high tensile strength aircraft cable which is resistant to being cut therethrough.

If a person attempts to cut through the aluminum main bar with an appropriate cutting blade, the person's cutting blade will engage the steel cable extending through the main bar. The steel cable will resist from being further cut for protecting the main arm from further cutting therethrough. Also, the steel cable is free to be displaced laterally by the cutting blade such that the blade contacts various positions along the cable as the blade reciprocates in a cutting motion, making it more difficult to cut through the cable.

A suitable locking mechanism 80 is provided for securing the collar in place on the main arm 50.

Since there can be many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A portable anti-theft device for use in conjunction with a tracked snowmobile having a track, the device comprising:

an elongate main arm;

first and second confronting hooks mounted on the main arm for engaging over opposite side edges of the track, each hook having a mounting section extending outward from the main arm and a retaining section mounted on the mounting section spaced from the main arm to extend inward towards the other hook for capturing a side edge of a track between the retaining section and the main arm, the hooks being mounted on the arm for relative movement of the hooks towards one another;

a pair of guard flanges mounted adjacent each hook and extending laterally outward from opposing sides of the main arm transversely to the mounting sections for extending across the track; and locking means for locking the hooks on the arm.

2. The device of claim 1 wherein the first hook is fixed to the arm and the second hook is movable along the arm.

3. The device of claim 1 including an internal locking mechanism mounted on the second hook in the form of a key lock including a pin for insertion into an aperture on the main arm.

4. The device of claim 3 including a guard in the form of flanges extending from a base of the lock and surrounding a housing of the lock.

5. The device of claim 1 wherein the main arm is a tubular member being enclosed at respective ends of the main arm.

6. The device of claim 5 wherein there is provided a flexible member extending through the tubular member connected between first and second ends of the main arm, the flexible member being made of a suitable high tensile strength material to resist being cut therethrough.

7. The device of claim 6 wherein the flexible member is in the form of a steel cable.

8. The device of claim 1 including a pair of secondary guard flanges mounted on the retaining section of each hook, wherein the secondary guard flanges extend with the guard flanges mounted on the main arm, transversely to the mounting sections.

9. In combination with a snowmobile track having a center section and two outer edge sections connected by track bars, an anti-theft device comprising:

a main arm having a length which is greater than a width of the track;

clamp means for clamping the arm to the track including first and second clamps in the form of confronting hooks for engaging over opposite side edges of the track, with a section of each clamp extending over an inner face of the track, the clamps being mounted on the main arm for relative movement of the clamps towards one another;

locking means for locking the clamp means on the arm; and a pair of guard flanges extending laterally outward from opposing sides of the main arm across the outer face of the track and overlapping respective adjacent track bars.

10. In combination with an elongate snowmobile track having an inner face, an outer face and laterally extending track bars spaced longitudinally along the track, an anti-theft device comprising:

a main arm which is longer than a width of the track;

clamp means for clamping the main arm adjacent the outer face of the track including first and second clamps in the form of confronting hooks engaging over opposite side edges of the track, an engaging section of each clamp extending over the inner face of the track, the clamps being mounted on the arm for relative movement of the clamps towards one another; and locking means for locking the clamp means on the arm.

11. The combination of claim 10 wherein the first clamp is fixed to the arm and the second clamp is movable along the arm.

12. The combination of claim 11 including an internal locking mechanism mounted on the second clamp in the form of a key lock including a pin for insertion into an aperture on the main arm.

13. The combination of claim 12 including a guard in the form of flanges extending from a base of the lock and surrounding a housing of the lock.

14. The combination of claim 10 wherein the snowmobile track has a center section and two outer edge sections connected by the track bars and wherein the clamps each include a pair of wings, the wings extending laterally outward from opposing sides of the engaging section of the respective clamps across the respective outer edge sections of the track and overlapping respective adjacent track bars.

15. The combination of claim 10 wherein the snowmobile track has a center section and two outer edge sections connected by the track bars and wherein the main arm includes a pair of wings mounted thereon adjacent each clamp, the wings extending laterally outward from opposing sides of the engaging section of the respective clamps across the outer edge sections of the track and overlapping respective adjacent track bars.

16. The combination of claim 10 wherein the main arm is a tubular member being enclosed at respective ends of the main arm.

17. The combination of claim 16 wherein there is provided a flexible member extending through the tubular member connected between first and second ends of the main arm, the flexible member being made of a suitable high tensile strength material to resist being cut therethrough.

18. The combination of claim 17 wherein the flexible member is in the form of a steel cable.

* * * * *